United States Patent [19]
Green

[11] 3,880,032
[45] Apr. 29, 1975

[54] FEELER OPERATED SAW GUARD

[76] Inventor: Dwight C. Green, Rt. 1, Box 74-B, Ashburn, Va. 22011

[22] Filed: Aug. 22, 1973

[21] Appl. No.: 390,555

[52] U.S. Cl. .................. 83/102.1; 83/478; 83/544; 83/860
[51] Int. Cl. ............................................. B27g 19/02
[58] Field of Search ........... 83/102.1, 478, 860, 544

[56] References Cited
UNITED STATES PATENTS

| 997,720 | 7/1911 | Troupenat | 83/102.1 |
| 2,466,325 | 4/1949 | Ocenasek | 83/102.1 |
| 2,572,326 | 10/1951 | Evans | 83/102.1 |

FOREIGN PATENTS OR APPLICATIONS

| 1,228,499 | 4/1971 | United Kingdom | 83/478 |

Primary Examiner—Donald R. Schran
Attorney, Agent, or Firm—Harry W. Brelsford

[57] ABSTRACT

A pivoted finger feels the thickness of a board by rotating to the angular position that allows the board to pass under the feeler. The feeler finger rotates a cam that in turn actuates a mechanism to lift the saw guard by the dimension indicated by the angular position of the feeler. Thereupon the board or other work piece can be cut by the saw. The guard preferably does not rest on the work piece so that work feeding friction is at a minimum. The guard raising mechanism may be mechanical, hydraulic or electric, and the mechanism may be mounted on a splitter for saw blades that can be set at an angle to the saw table other than 90°. The mechanism may be mounted on an over-the-table arm for stationary saws or for radial arm saws in which latter case the guard and feeler move with the saw.

3 Claims, 11 Drawing Figures

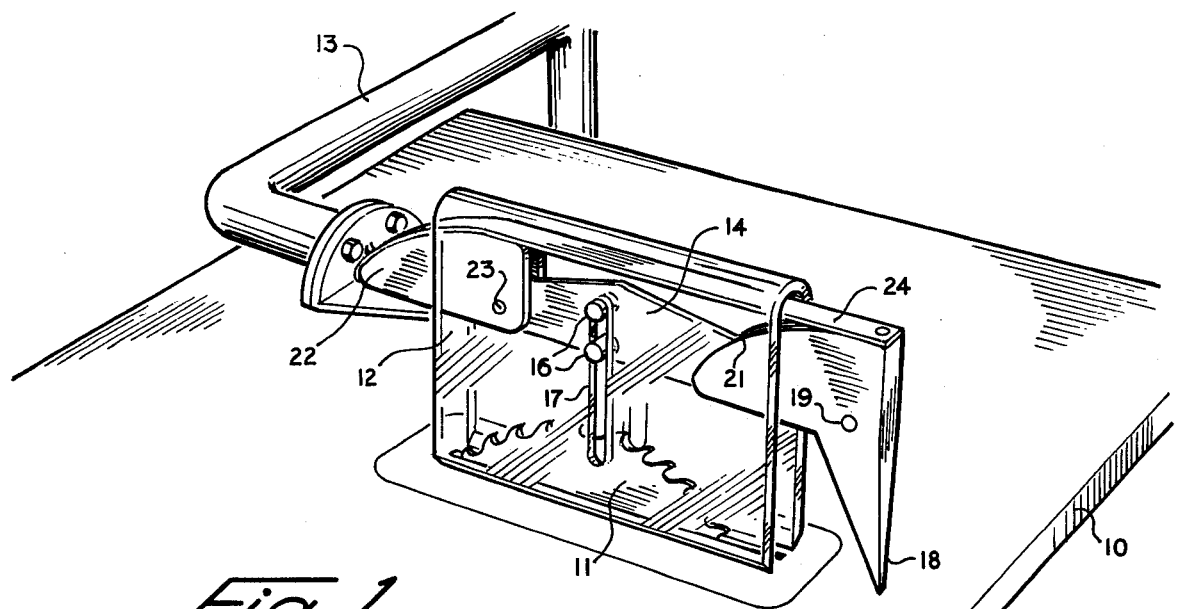
Fig. 1
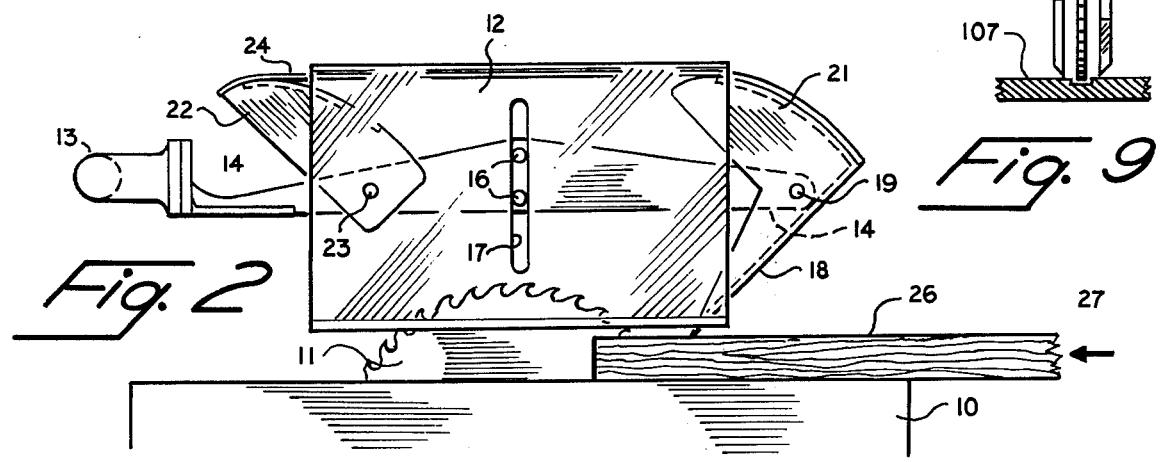
Fig. 2
Fig. 3A
Fig. 9
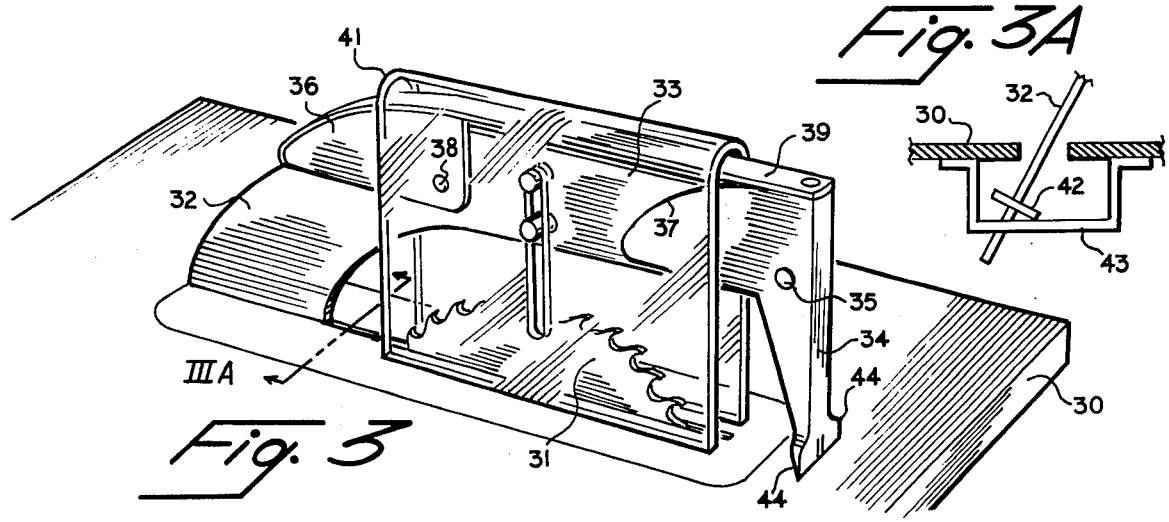
Fig. 3

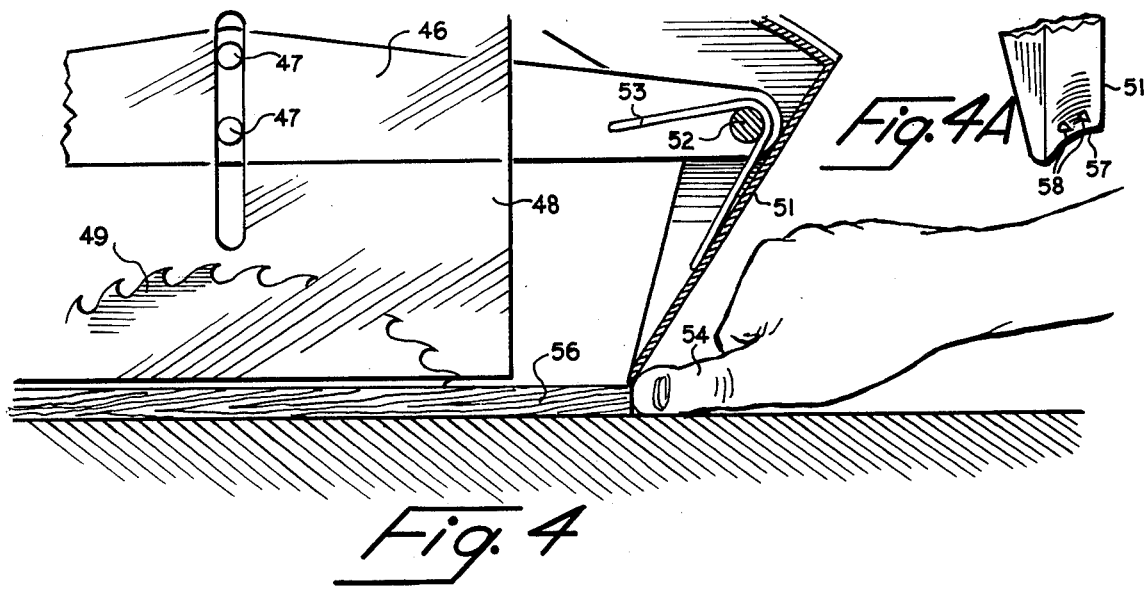
Fig. 4
Fig. 4A
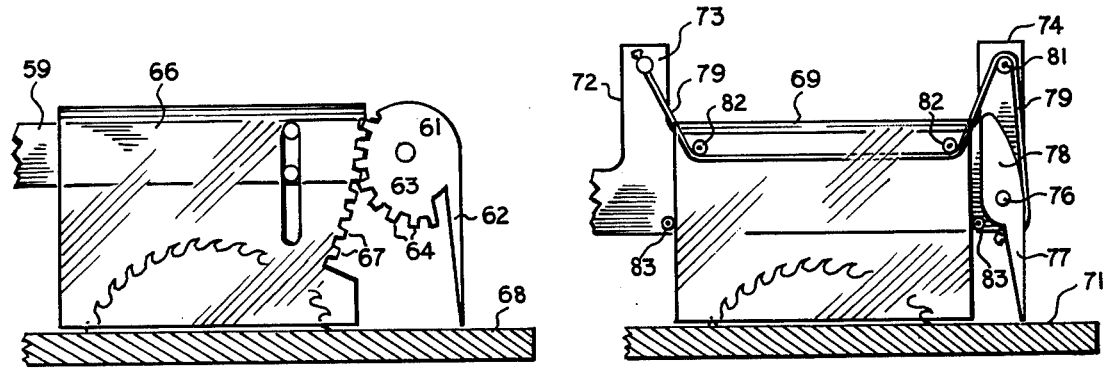
Fig. 5
Fig. 6
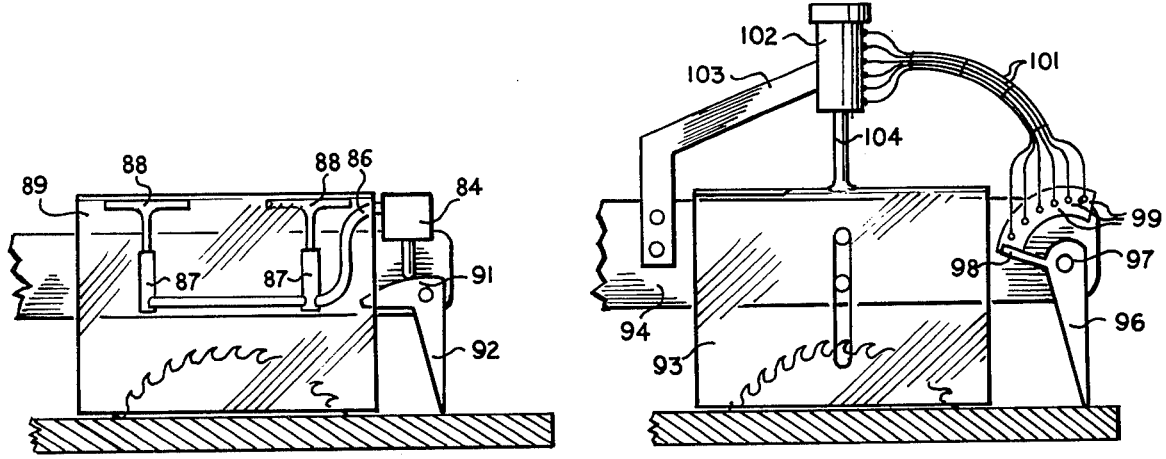
Fig. 7
Fig. 8

FEELER OPERATED SAW GUARD

This invention relates to guards for saws so that the operator's fingers will be excluded from the saw area by the guard.

The usual saw guard is hinged at a point behind the saw from the operator's position. The work piece moved toward the saw first encounters the hinged guard which usually has a tapered forward end to be engaged by boards of different thickness. The operator must push the work piece hard enough to lift the guard, whereupon the board can contact the saw for cutting. As the work piece moves through the saw, the weight of the guard bears against it, increasing the friction which the operator must overcome in addition to the resistance of the saw.

Various devices have been devised to reduce this saw guard friction, including wheels on the forward edge, counter balances, etc., but none have proven to be commercially acceptable. More often than not the operator dispenses with a saw guard altogether, to avoid the difficulties and inconvenience of the usual guard. He thus loses a valuable safety aid and runs the risk of severe injury.

In summary, the present invention avoids these problems by providing a feeler finger in front of the saw blade that senses the thickness of the work piece to be sawed. This feeler finger in turn operates a cam which actuates the lifting mechanism, either directly or indirectly. Preferably the feeler is pivoted and normally is disposed at right angles to the table surface. The work piece moving toward the saw rotates the feeler until the work piece can pass under the feeler, at which point feeler rotation ceases. Because the feeler rotation and the dimension from feeler tip to table is approximately an ellipsoidal function, the cam must be non-linear to follow this function. The cam, in turn, causes the guard to be lifted through a guard lifting means which may be mechanical, electrical or hydraulic. The guard prefereably is light in weight to reduce the resistance to work piece movement by the operator. Preferably also the guard clears the work piece by a minute dimension to avoid any friction between the work piece and the guard. The guard can fully enclose the saw or be two-sided only. The feeler also operates as an anti kick back device.

Various objects, advantages and features of the invention will be apparent in the following description and claims considered together with the drawings forming an integral part of this disclosure and specification, in which:

FIG. 1 is a three-dimensional view of a table saw having in combination therewith a saw guard embodying the invention.

FIG. 2 is an elevation view of the mechanism of FIG. 1 when a board has been moved to the saw for cutting.

FIG. 3 is a three-dimensional view of a modified form of the invention wherein the saw guard and actuating mechanism is mounted on a splitter plate.

FIG. 3A is a fragmentary sectional view along the line IIIA — IIIA of FIG. 3 showing a mechanism for elevating the splitter plate when the saw blade and its associated splitter plate are disposed at an angle to the saw table.

FIG. 4 is an elevation view of a modified form of the invention similar to that of FIG. 2, but wherein the feeler finger is spring biased to act upon the thumb of the operator to move the thumb away from the saw blade so that the operator will not be cut by the blade.

FIG. 4A is a fragmentary three-dimensional view of the tip of a modified form of feeler finger for use with the apparatus of FIG. 4 wherein a recess is provided with a pair of sharp pins for inflicting pain upon the operator's thumb when it gets too close to the saw blade, as illustrated in FIG. 4.

FIG. 5 is an elevation view of a modified form of the invention wherein the saw guard is raised by means of a rack and gear.

FIG. 6 is an elevation view of another modified form of the invention wherein the saw guard is raised by a pulley system.

FIG. 7 is an elevation view of a modified form of the invention wherein the saw guard is raised by means of a hydraulic master cylinder and slave cylinders.

FIG. 8 is an elevation view of still another modified form of the invention wherein the saw guard is raised by means of a stepped solenoid motor operated by means of a cammed step switch.

FIG. 9 is a fragmentary end view of a modified form of the invention wherein the invention is applied to a saw that moves with respect to a stationary work piece.

Referring to FIG. 1 there is illustrated a saw table 10 having a circular saw blade 11 projecting therethrough which is enclosed on both sides by a saw guard 12 in the shape of an inverted U. This saw guard is preferably made of transparent material such as a tough plastic. Disposed over the saw table 10 is an arm 13 which supports a horizontally extending but vertically oriented plate 14. This plate 14 supports the mechanism of the invention. Disposed on each side of the plate 14 are a pair of guide pins 16 which fit in slots 17 in the saw guard 12 so that the saw guard 12 can freely move in a vertical direction. The slots 17 and pins 16 could be arranged at an angle if desired.

Pivoted to the right-hand end of the support beam 14 is a feeler member 18 pivoted at 19 to this beam 14. Directly connected to the feeler finger 18 is a cam surface 21 which may have an empirical shape such that angular movement of the feeler 18 as viewed in FIG. 1 in a clockwise direction will present a cam surface that lifts the guard 12 by the same amount that the bottom end of the feeler finger 18 is spaced from the saw table 10. It is believed that this shape is generally part of an ellipse. Pivoted to the left-hand end of the support beam 14 at 23 is a second cam 22. The two cams are connected together by a flexible steel strap or tape 24.

Referring to FIG. 2 there is illustrated the operation of the mechanism of FIG. 1 when a work piece 26 is moved by the operator in the direction of the arrow 27. The work piece 26 encounters the feeler finger 18 and causes it to rotate to the position illustrated in FIG. 2, whereupon the work piece 26 can move to the saw 11 for cutting. The feeler finger 18 rotates the cam 21 which, in turn, pulls on the steel tape 24 to cause the rear cam 22 to rotate an identical amount. Inasmuch as the cam surfaces 22 and 21 are identical, both will rise up the same amount with regard to the horizontal steel tape 24 stretched between them. The tape 24 bears against the inside of the U shape of the guard 12 and lifts it just a slight amount higher than the feeler tip 18. This slight amount above the work piece 26 insures that there will be no operating friction between the guard and the work piece 26, thereby relieving the operator of any added effort.

Referring to FIG. 3, there is illustrated a modified form of the invention wherein a saw table 30 has a saw 31 projecting therethrough and to the rear or left of the saw is a splitter plate 32 having a thickness the same as the saw cut in the work piece, or slightly less than the width of a saw cut. The splitter plate 32 has a horizontal section 33 which supports a feeler finger 34 pivoted at 35 and also supports a rear cam 36 pivoted at 38. The feeler finger 34 has integrally formed thereon a cam surface 37. Stretched between the cam 36 and the cam 37 is a steel tape 39 which bears against the inside of the U shape of a transparent saw guard 41.

The splitter type of support is particularly useful where the saw is movable to an agle with respect to the saw table so as to cut edges other than those at 90°. Most table saws are so constructed that the tilting axis of the blade is above the table top, in which case no adjustment or change is needed in my guard mechanism.

Illustrated in FIG. 3A, however, is a mechanism whereby the splitter plate 32 is elevated the necessary amount to clear the sides of the U shaped guard 41 when it is moved to angular positions on the saw types wherein the blade tilting axis is at or below the saw table. This mechanism includes a cross bar 42 secured to the splitter plate below the table surface and includes also a rectangular bracket 43 which engages this cross piece 42. The cross piece 42 has the same dimension as the outside transverse dimension of the U shaped saw guard 41. Accordingly, when the splitter plate is disposed at any angle the cross piece 42 rubbing against the bar 43 will cause the splitter plate 32 to rise up, depending upon the angle encountered.

It will be noted particularly with respect to FIG. 3 that the bottom-most part of the feeler finger 34 is broadened out at 44 so that it is the same width as the outside transverse dimensions of the saw guard 41. In this fashion the feeler finger will accurately relate to the down-hill side of the saw guard when the splitter plate and the associated saw guard mechanism are disposed at an angle, as shown in FIG. 3A. For this structure also the pivot point 35 must be enough to the right as viewed in FIG. 3 so that the widened feeler tips 44 will not strike the saw guard 41 when a big piece of material is being cut.

Referring to FIG. 4 a horizontal support beam 46 has a pair of guide pins 47 which support an inverted U-shaped saw guard 48 guarding a saw blade 49. A feeler finger 51 is pivoted at 52 to the right-hand end of the support 46 and a spring 53 strongly urges the feeler finger 51 to a vertical position when it is at rest. An operator may place his thumb 54 against a work piece 56 to move it through the saw 49. When, however, the thumb 54 reaches the area of the saw 49, it will be encountered by the feeler finger 51 and under the pressure of the spring 53 will force the operator's thumb to the right away from the saw, thus creating an additional safety.

Illustrated in FIG. 4A is a modified form of the invention of FIG. 4 wherein the bottom-most part of the feeler finger 51 has a rounded recess 57 formed therein from which project sharp points 58. When the operator's thumb contacts the feeler finger 51 of FIG. 4A, it will be pieced by the sharp points 58 and the sudden pain will cause a quick withdrawal of the thumb 54 from the dangerous area of the saw 49. The cavity 57 insures that the sharp points 58 will not strike or drag across any work piece.

Referring to FIG. 5 there is illustrated a modified form of the invention wherein a support beam 59 has pivoted to the right end thereof at 61 a feeler finger 62 having a cam shape 63 which has gear teeth 64 cut therein. A vertically movable saw guard 66 has gear teeth 67 formed thereon which mesh with the gear teeth 64 of the cam 63. Accordingly, a rack and gear mechanism lifts or lowers the saw guard 66 away from a saw table 68.

Referring to FIG. 6, there is illustrated a pulley mechanism for lifting a saw guard 69 away from a saw table 71. A horizontal support beam 72 has an upwardly extending projection 73 on the left and an upwardly extending projection 74 on the right. Pivoted at 76 is a feeler point 77 having a cam surface 78 connected thereto and a cord 79 is connected at one end to the projection 73, passes through the saw guard 69 and over a pulley 81 on the projection 74 and is then connected to the feeler point 77. As the feeler point 77 rotates clockwise, the cam surface 78 will pull against the cord 79 and lift up the saw guard 69. If desired, a pair of pulley wheels or pulley pins 82 may be provided in the saw guard 69 to reduce friction. A pair of guide rollers 83 may keep the guard 69 in its position horizontally as it moves up and down.

Referring to FIG. 7 there is illustrated a hydraulic embodiment of the invention wherein a master cylinder 84 is connected by a conduit 86 to a pair of slave cylinders 87 in which reciprocate slave pistons 88 which raise and lower a saw guard 89. The master cylinder 84 is actuated by a cam surface 91 integreally connected to a feeler finger 92.

Illustrated in FIG. 8 is another modification of the invention wherein a saw guard 93 is raised and lowered electrically. In this case a horizontal beam 94 supports a feeler finger 96 pivoted at 97 and which has a switch arm 98 connected thereto. A plurality of contacts 99 are arranged in a circular array about the pivot point 97, but it will be noted that the contact points 99 are not linear in their spacing. Accordingly, this non-linearity gives rise to an electrical cam. Leading from each contact 99 are wires 101 which connect to different windings on a solenoid motor 102 supported by a bracket 103 from the support beam 94. The solenoid 102 acts on a vertically movable armature 104 to pull it to the particular winding energized and it, in turn, is connected to the saw guard 93 to lift it to the particular position indicated by the contact of the arm 98 with the switch points 99.

The invention is applicable also to saws which move relative to a stationary work piece. These saws are generally referred to as overhead saws or radial arm saws and there are some saws that move that project through a slit in a table. Illustrated in FIG. 9 is a schematic representation of a saw blade 106 which is spaced above and travels over a saw table 107. Disposed on each side of the saw blade 106 is a U-shaped saw guard 108 which may be actuated in the same fashion as that of FIG. 1. The axis of rotation of the saw blade 106 is not illustrated in FIG. 9, nor is the appropriate feeler finger for raising the saw guard 108, inasmuch as this is readily apparent from an inspection of FIG. 1.

The invention has been described with respect to presently preferred embodiments thereof, as required by the Rules of the Patent Office. For example, in FIG. 4 the weight of the feeler and cam may take the place of spring 53. The invention, however, is not limited to the modifications and embodiments illustrated. The appended claims include within their scope all variations and modifications of the invention that come within the true spirit and scope of the invention.

I claim:

1. In combination with a saw table having a saw projecting through the table, a guard mechanism comprising:
   a. a support disposed above the saw table;
   b. a feeler pivoted to the support and having one free end normally disposed closely adjacent to the saw table to be contacted by a work piece having relative movement with respect to the saw;
   c. a first non-linear cam rotated by the feeler as the feeler rotates in response to being contacted by a work piece;
   d. a second non-linear cam and mounted for rotation on the support;
   e. a flexible tension strap connecting the cams together so that they rotate in unison;
   f. and a saw guard disposed over the saw and normally positioned over the saw and close to the saw table and mechanically engaging at least one of said tension strap and cams for movement toward and away from the saw table, whereby rotation of the feeler by a work piece causes the cams to rotate and lift the guard vertically a distance just sufficient to allow the work piece to pass under the guard and contact the saw.

2. The combination of claim 1 wherein the free end of the feeler finger has a pointed terminus to dig into work pieces and thus act as an anti-kickback.

3. The combination of claim 1 wherein the saw is moveable to different angles relative to the saw table, the guard mechanism is mounted on a splitter plate, and the table is provided with a splitter plate lifting and lowering mechanism so that the feeler and guard maintain the same clearance from the table, regardless of the angle of the saw to the table.

* * * * *